E. D. SCHMITT.
GLASS JAR OR BOTTLE.
APPLICATION FILED DEC. 9, 1909.
1,049,926.
Patented Jan. 7, 1913.
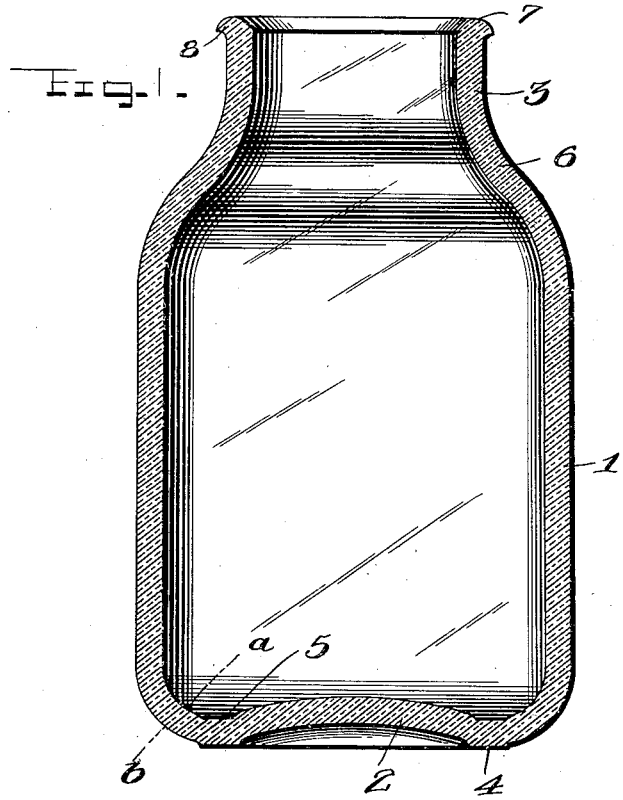
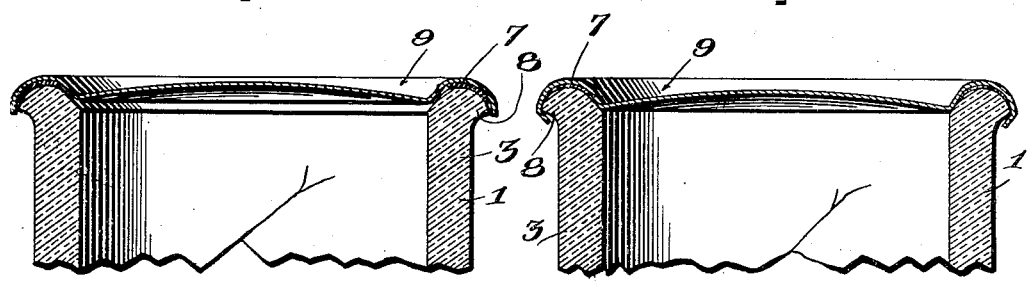

UNITED STATES PATENT OFFICE.

EDWARD D. SCHMITT, OF BALTIMORE, MARYLAND, ASSIGNOR, BY DIRECT AND MESNE ASSIGNMENTS, TO THE PURE FOOD PROCESS COMPANY, OF BALTIMORE, MARYLAND, A CORPORATION OF MARYLAND.

GLASS JAR OR BOTTLE.

1,049,926.      Specification of Letters Patent.      Patented Jan. 7, 1913.

Application filed December 9, 1909. Serial No. 532,225.

*To all whom it may concern:*

Be it known that I, EDWARD D. SCHMITT, a citizen of the United States, residing at Baltimore city and State of Maryland, have invented certain new and useful Improvements in Glass Jars or Bottles, of which the following is a specification.

This invention relates to glass jars or bottles and has for its object to provide a jar or bottle especially adapted for use in practising a method of preserving food products, a step of which consists in cooking raw products while packed or contained in glass jars or bottles.

Jars of the construction now available in the market, have been found by me, as a result of considerable experiment, utterly unsuited for the purpose, since they cannot withstand the extreme heat to which they are subjected in cooking the contents of the jar, or cooling step in the process, without cracking, nor can they stand the very considerable pressure required in applying a cap or closure to the jar, which is another step in the process in connection with which, the present jar is intended for use. Jars of usual construction crack so readily under both heating and cooling steps of the process above mentioned, as to render the method practically prohibitive, when the usual or common jar is used.

I have found that the cracking of the jars in the heating incident to cooking, and the pressure present at that time, and the cooling steps of the process, is due to the unequal or non-uniform heating up and cooling off, of the jar, or the unequal expansion and contraction during the cooking and cooling process, respectively.

With the object in view of providing a jar or bottle which will withstand the pressure in sealing, and the conditions of heating and cooling the vessel, and also to provide a jar to which a cap may be applied without any very considerable lateral pressure being required for bending or flexing portions of the cap into locking engagement with the locking shoulder or bead at the top of the jar or bottle, my invention consists of a glass jar or bottle having its side and bottom walls so constructed as to provide a co-acting, heat-diffusing or justifying medium, actuated by the circumferential expansion of the side wall with the vertical depression of the bottom wall, and the contraction of the side wall with the simultaneous elevation of the bottom wall, upon the discharge of the diffused heat by radiation, whereby the strain induced by heat and cold is equalized.

In the drawings: Figure 1 is a vertical section of my improved glass jar; and Figs. 2 and 3 are detail, sectional views of the jar-neck, showing respectively, a cap in position to be flexed, and the cap permanently flexed.

In the several views, the numeral 1, indicates the wall or body of my jar or bottle which is provided with a vertically-extendible and depressible bottom 2, and a neck 3 of peculiar formation. The jar or bottle is composed of an expansible and contractible material, such as glass, and its bottom is so joined or united with the wall or body that the circumferential expansion or contraction of said wall, in its tension action of the bottom, will be justified or made even by the elasticity of the vertically-actuating flexible bottom, which is provided, on its outer surface, with an annular depending or projecting rib 4 and on its inner surface with a correspondingly shaped depression or groove 5, whereby such action between the wall and bottom is produced.

The neck of the jar or bottle is joined or united to the wall or body by a slopingly curved shoulder 6, the curvature being so gradual that the neck-wall will be brought as near on a line with the body-wall as possible, without increasing the diameter of the mouth of the jar, and in line with the depressed-depending annulus 4, so that the strain upon the jar-neck, incident to the application of great pressure in applying the sealing-cap, will be taken up by the slopingly-curved shoulder and conveyed to the wall or body.

In constructing the jar or bottle, the wall or body, neck and bottom are of equal or uniform thickness, as is also that portion of the jar where the bottom joins the wall, as shown by the oblique line 2—6, Fig. 1. By making the various walls of equal or uniform thickness, and providing the bottom wall with the vertically extensible and depressible annulus, all strain due to circumferential expansion and contraction of the wall or body of the jar—when exposed to the action of heat or cold—will be justified by the elasticity of said bottom.

The upper end of the neck is slightly rounded or curved to form the mouth 7, the outer portion of the mouth curving outwardly and downwardly to a sharp lip 8, which serves as a fulcrum upon which portions of the flange of a sealing-cap 9 may be flexed into locking contact with the lip. By the aid of this form of lip, the permanent flexing of the sealing-cap is accomplished with very slight pressure, and it is not necessary to permanent sealing, to flex the flange of the cap tightly against the under surface of the locking shoulder, owing to the sharply-defined lip.

It will be understood that in the process or method hereinbefore referred to, the product to be preserved is placed in the jars and hermetically sealed before being introduced into the cooking-chamber, and as the jar is subjected to considerable strain in the sealing-operation, and to great heat in the cooking-process, it will be evident that the construction of the jar must be such as will successfully withstand the pressure and the heating and cooling steps in the process. Jars constructed in accordance with my invention have been used in large quantities, in connection with the aforementioned process or method, and have successfully withstood the tests of heating, cooling and pressure, and fulfilled all other requirements.

Having thus fully described my invention, what I claim is:

1. A new article of manufacture, a jar or bottle comprising a circumferential wall or body and a vertically extensible and depressible bottom, so joined or united that the circumferential expansion of the body-wall, in its tension action on the bottom, will be justified by the elasticity of said bottom.

2. A glass jar or bottle having all of its walls and that portion which joins or unites the bottom-wall with the body-wall of uniform or equal thickness, and its neck united or joined to the body-wall by a gradually-curved and sloping shoulder, so that the strain will be directed to the body-wall in an approximately vertical line.

3. A glass jar or bottle having all of its walls and that portion which joins or unites the bottom wall with the body-wall of equal or uniform thickness; its neck joined or united to the body wall by a gradually-curved sloping shoulder, and its neck provided with a lip serving as a fulcrum in permanently flexing a sealing-cap against the under portion of said lip.

In testimony whereof I affix my signature in presence of two witnesses.

EDWARD D. SCHMITT.

Witnesses:
JOSEPH E. HUNTER,
G. RUSSELL BIXLER.